United States Patent
Holub et al.

(10) Patent No.: US 6,825,278 B2
(45) Date of Patent: Nov. 30, 2004

(54) MODIFIED PRESSURE SENSITIVE ADHESIVE

(75) Inventors: Pavel Holub, Sokolov (CZ); Edita Moudra, Karlovy Vary (CZ); Olga Bernatova, Sokolov (CZ); Jiri Horalek, Pardubice (CZ); Jiri Havranek, Kolin (CZ)

(73) Assignee: Resolution Specialty Materials LLC, Houston, TX (US)

( * ) Notice: Subject to any disclaimer, the term of this patent is extended or adjusted under 35 U.S.C. 154(b) by 0 days.

(21) Appl. No.: 10/346,350

(22) Filed: Jan. 16, 2003

(65) Prior Publication Data

US 2004/0143065 A1 Jul. 22, 2004

(51) Int. Cl.$^7$ .................. C08L 33/00; C08L 33/02; C08L 33/04; C08L 35/00; C08L 39/04
(52) U.S. Cl. .............. 525/203; 525/205; 525/217; 525/221; 525/222; 525/225; 525/230
(58) Field of Search ................. 525/203, 205, 525/217, 221, 222, 225, 230

(56) References Cited

U.S. PATENT DOCUMENTS

| | | | |
|---|---|---|---|
| 3,728,148 A | 4/1973 | Pietsch et al. | |
| 4,181,752 A | 1/1980 | Martens et al. | |
| 4,310,509 A | 1/1982 | Berglund et al. | |
| 4,337,325 A * | 6/1982 | Shah | 525/205 |
| 4,364,972 A | 12/1982 | Moon | |
| 4,370,380 A | 1/1983 | Shah | |
| 4,812,541 A | 3/1989 | Mallya et al. | |
| 4,908,403 A | 3/1990 | Spada et al. | |
| 5,512,612 A * | 4/1996 | Brown et al. | 523/218 |
| 5,645,855 A | 7/1997 | Lorenz | |
| 6,379,791 B1 * | 4/2002 | Cernohous et al. | 428/355 R |
| 6,448,337 B1 * | 9/2002 | Gaddam et al. | 525/193 |

FOREIGN PATENT DOCUMENTS

| | | |
|---|---|---|
| EP | 0 130 080 A1 | 1/1985 |
| WO | WO 90/15111 A1 | 12/1990 |
| WO | WO 90/15853 A1 | 12/1990 |
| WO | WO 91/18070 A1 | 11/1991 |
| WO | WO 97/33645 A1 | 9/1997 |

OTHER PUBLICATIONS

FINAT Technical Handbook, 5th Editiion, 1999, pp. 22–24.
Journal of Applied Polymer Science, vol. 23, 2453–2462 (1979).

* cited by examiner

Primary Examiner—Nathan M. Nutter

(57) ABSTRACT

A modified pressure sensitive adhesive (PSA) is produced by polymerizing at least one ethylenically unsaturated monomer to form a base polymer and reacting the base polymer with a modifying polymer comprising units derived from a n-vinyl lactam to thereby produce a modified polymer. The modified polymer can be used to form modified PSAs having improved adhesion properties over PSAs formed from the unmodified base polymer.

25 Claims, No Drawings

MODIFIED PRESSURE SENSITIVE ADHESIVE

FIELD OF THE INVENTION

The invention relates to modified pressure sensitive adhesives (PSAs) having improved adhesion properties. In another aspect, the invention concerns a novel process for producing such modified PSAs. The inventive modified PSAs are useful as, for example, tapes, labels, stickers, decals, decorative vinyls, laminates, and wall coverings.

BACKGROUND OF THE INVENTION

Pressure sensitive adhesives (PSAs) are useful in many applications for bonding a flexible material to another surface. PSAs may be classified according to the chemical composition (i.e., the main elastomer) used in the adhesive formulation. The largest class of PSAs in use today are polyacrylates. A distinct and advantageous feature of polyacrylates is that they are tacky without compounding with tackifying resins. A further advantage is that polymerization of acrylic monomers does not require expensive equipment.

Acrylic PSAs are typically produced either by emulsion or solution polymerization. Emulsion polymerization is by far the most important process for producing acrylic PSAs because acrylic dispersions are environmentally safe, easy to handle, and economical. Further, acrylic dispersions from emulsion polymerization exhibit good adhesive properties, coatability at very high speeds, and favorable die-cutting properties.

The adhesion properties of the acrylic PSA dispersions resulting from emulsion polymerization are greatly influenced by the type and relative quantities of monomers employed in the polymerization process. Most pressure sensitive acrylic adhesives are formed from acrylic esters that yield soft tacky polymers of low glass transition temperature ($T_g$). The primary monomers used to form acrylic PSAs are alkyl acrylates and methacrylates of 4 to 17 carbon atoms. In particular, butyl acrylate, 2-ethylhexyl acrylate, and iso-octyl acrylate are known monomers which can be polymerized to yield soft and tacky homopolymers. However, homopolymers are not generally used for pressure sensitive adhesives. Rather, homopolymers are typically modified by copolymerization with at least a small portion of other comonomers. Copolymerization with other monomers is a universally used technique to vary adhesive properties. Typically, the main monomer (i.e., alkyl acrylates and methacrylates of 4 to 17 carbon atoms) are copolymerized with a modifying monomer (typically a second acrylic ester) and/or monomers with functional groups (e.g., acrylic, methacrylic, itaconic acids and their amides). The functional groups may affect a wide range of properties and also provide crosslinking sites. Polar comonomers, in particular carboxyl groups, which are used in comparatively small amounts can have a strong impact on the adhesion properties. In general, a typical pressure sensitive acrylic polymer composition is derived from the following monomers: main monomer (50–98%), modifying monomer (10–40%), and monomer with functional groups (0.5–20%).

It is commonly known that the adhesion properties of PSAs can be varied by the grafting or crosslinking of polymers. Crosslinking typically improves the creep and shear resistance of PSAs. However, crosslinking is usually accompanied by a decrease in tack and peel. Generally, crosslinking increases the shear and tensile moduli, and especially its elastic component, at the expense of the viscous one. Thus, there exists a need for PSAs, and methods for producing such PSAs, that exhibit improved shear strength without a significant reduction in peel and tack.

SUMMARY OF THE INVENTION

In accordance with one embodiment of the present invention, a method of making a modified pressure sensitive adhesive (PSA) is provided. The method comprises forming a monomer mixture comprising a main monomer; polymerizing the monomer mixture to thereby form a polymerized mixture comprising a base polymer having units derived from the main monomer; and after substantial completion of the polymerizing step, reacting a modifying polymer comprising units derived from a n-vinyl lactam with the polymerized mixture in the presence of a free-radical initiator to thereby form a modified mixture comprising a modified polymer.

In accordance with another embodiment of the present invention, a method of making a modified PSA is provided. The method comprises forming a monomer mixture comprising an ethylenically unsaturated acid ester having a glass transition temperature less than about 0° C. and an ethylenically unsaturated acid; emulsion polymerizing the ethylenically unsaturated acid ester and the ethylenically unsaturated acid to thereby form an acidic polymerized mixture comprising a base copolymer, wherein the base copolymer comprises 50 to 98 weight percent of units derived from the ethylenically unsaturated acid ester and 0.1 to 20 weight percent of units derived from the ethylenically unsaturated acid; after at least about 80 weight percent of the ethylenically unsaturated acid ester has been polymerized, adding polyvinyl pyrrolidone to the polymerized mixture to thereby form a modified mixture comprising a modified polymer; and neutralizing the modified mixture to a pH of at least about 7.0 to thereby form a neutralized mixture.

In accordance with still another embodiment of the present invention, a method of making a modified PSA is provided. The method comprises copolymerizing a main monomer and a functional monomer via emulsion polymerization to thereby form a polymeric backbone having a carboxylic functional group; and after substantial completion of the copolymerization step, reacting a polyvinyl pyrrolidone polymer with the polymeric backbone to thereby chemically bind the polyvinyl pyrrolidone polymer to the backbone at the carboxylic functional group.

In accordance with yet another embodiment of the present invention, a modified polymer composition suitable for use in PSAs is provided. The modified polymer composition comprises a polymeric backbone comprising main units derived from a main monomer having a glass transition temperature of less than about 0° C. in homopolymerized form and functional units derived from a functional monomer having a carboxylic functionality. The modified polymer composition further comprises a modifying polymeric moiety that has been chemically bound to at least one of said functional units of said polymeric backbone. Prior to being chemically bound to the functional unit, the modifying polymeric moiety was a modifying polymer comprising units derived from a n-vinyl lactam.

The inventive modified PSA and process for making such modified PSA provide an adhesive composition having a substantially improved shear strength without significant reduction in peel and tack.

DETAILED DESCRIPTION OF THE INVENTION

One embodiment of the present invention concerns a method of making a pressure sensitive adhesive (PSA), wherein the method comprises: (1) preparing a monomer mixture comprising one or more polymerizable monomers; (2) polymerizing the monomer mixture to form a polymerized mixture; (3) modifying the polymerized mixture with a modifying polymer; and (4) neutralizing the resulting modified mixture.

Generally the monomer(s) employed in the monomer mixture can be any ethylenically unsaturated monomer that is capable of undergoing polymerization or copolymerization according to the present invention. Examples of suitable ethylenically unsaturated monomers are, for example, alkyl esters (e.g., (meth)acrylic acid esters); ethylenically unsaturated carboxylic acids; the nitriles, vinyl and vinylidene halides, and amides of unsaturated carboxylic acids; mono- and polyunsaturated hydrocarbon monomers; vinyl esters (e.g., vinyl esters of $C_1$ to $C_6$ saturated monocarboxylic acids); vinyl ethers; and amino monomers. By convention, the parentheticals used herein designate optional content (i.e., (meth)acrylate means "acrylate" or "methacrylate").

Examples of (meth)acrylic acid esters suitable for use in the present invention include $C_1$–$C_{17}$ alkyl(meth)acrylates. Typical (meth)acrylic esters include methyl(meth)acrylate, ethyl(meth)acrylate, isopropyl (meth)acrylate, n-butyl (meth)acrylate, isobutyl(meth)acrylate, hexyl acrylate, 2-ethylhexyl(meth)acrylate, t-butyl(meth)acrylate, 3,3-dimethylbutyl(meth)acrylate, and lauryl acrylate.

Monoethylenically unsaturated monocarboxylic acids suitable for use in the present invention include (meth) acrylic acid, ethacrylic acid, and crotonic acid. Suitable monoethylenically unsaturated dicarboxylic acids include maleic acid, fumaric acid, itaconic acid, and citraconic acid. Suitable monoethylenically unsaturated tricarboxylic acids include aconitic acid and the halogen-substituted derivatives (e.g., alphachloracylic acid), and the anhydrides of these acids (e.g., maleic anhydride and citraconic anhydride).

Nitriles of the above ethylenically unsaturated carboxylic acids which are suitable monomers include acrylonitrile, alpha-chloroacrylonitrile, and methacrylonitrile. Suitable amides of these carboxylic acids include unsubstituted amides such as (meth)acrylamide and other alpha-substituted acrylamides and n-substituted amides obtained by the reaction of the amides of the aforementioned carboxylic acids with and analdehyde (e.g., formaldehyde). Typical n-substituted amides include n-methylolacrylamide, n-methylolmethacrylamide alkylated n-methylolacrylamides, and n-methylolmethacrylamides (e.g., n-methyoxymethylacrylamide and n-methoxymethylmethacrylamide). Examples of vinyl and vinylidene halides include vinyl chloride, vinylidene chloride, vinyl fluoride and vinylidene fluoride.

Examples of suitable hydrocarbon monomers for use in the present invention include styrene compounds (e.g., styrene, carboxylated styrene, and alpha-methyl styrene), ethylene, propylene, butylene, and conjugated dienes (e.g., butadiene, isoprene and copolymers of butadiene and isoprene).

Suitable vinyl esters for use in the present invention include aliphatic vinyl esters, such as vinyl formate, vinyl acetate, vinyl propionate, vinyl butyrate, vinyl isobutyrate, vinyl valerate, and vinyl caproate, and allyl esters of saturated monocarboxylic acids, such as allyl acetate, allyl propionate, and allyl lactate.

Vinyl ethers suitable for use in the present invention include methylvinyl ether, ethylvinyl ether, and n-butylvinyl ether. Typically vinyl ketones include methylvinyl ketone, ethylvinyl ketone, and isobutylvinyl ketone. Suitable dialkyl esters of monoethylenically unsaturated dicarboxylic acids include dimethyl maleate, diethyl maleate, dibutyl maleate, dioctyl maleate, diisooctyl maleate, dinonyl maleate, diisodecyl maleate, ditridecyl maleate, dimethyl fumarate, diethyl fumarate, dipropyl fumarate, dibutyl fumarate, dioctyl fumarate, diisooctyl fumarate, didecyl fumarate, dimethyl itaconate, diethyl itaconate, dibutyl itaconate, and dioctyl itaconate.

Amino monomers useful in the present invention include substituted and unsubstituted aminoalkyl acrylates, hydrochloride salts of amino monomers, and methacrylates, such as beta-aminoethylacrylate, beta-amino-ethylnethacrylate, dimethylaminomethylacrylate, beta-methylaminoethylacrylate, and dimethylaminomethylmethacrylate.

In a particularly preferred embodiment of the invention, the monomer mixture includes a main monomer and at least one additional monomer that is copolymerizable with the main monomer.

The "main monomer" employed in the monomer mixture is preferably one or more ethylenically unsaturated acid esters. More preferably, the main monomer is a free-radically polymerizable (meth)acrylate monomer. Examples of suitable (meth)acrylate monomers include acrylate esters of non-tertiary alkyl alcohols, the alkyl groups of which have from about 2 to about 14 carbon atoms. Examples of such (meth)acrylate monomers include, but are not limited to, n-butyl acrylate, 2-ethylhexyl acrylate, iso-octyl acryl ate (an isomer of 2-ethylhexyl acrylate), 4-methyl-2-pentyl acryl ate, 2-methylbutyl acrylate, isoamyl acrylate, sec-butyl acrylate, tert-butyl acrylate, isobornyl acrylate, dodecyl acrylate, n-octyl acrylate, tridecyl acrylate, cyclohexyl acrylate, ethoxylated nonyl phenyl acrylate, methyl methacrylate, t-butyl methacrylate, iso-butyl methacrylate, butyl methacrylate, cyclohexyl methyl acrylate, hexyl methacrylate, iso decyl methacrylate, and hexyl ethyl methacrylate. Preferably, the main monomer, in homopolymerized form, has a glass transition temperature ($T_g$) (measured by differential scanning calorimetry) of less than about 0° C., preferably less than about −20° C., and most preferably between −60° C. and −30° C. Particularly preferred main monomers suitable for use in the present invention include n-butyl acrylate, iso-octyl acrylate, 2-ethylhexyl acrylate, ethyl acrylate, n-propyl acrylate, isobutyl acrylate, n-hexyl acrylate, lauryl acrylate, n-hexyl methacrylate, and n-octyl methacrylate. More preferably, the main monomer is selected from the group consisting of n-butyl acrylate, 2-ethylhexyl acrylate, and iso-octyl acrylate. Most preferably, the main monomer is n-butyl acrylate. Generally the amount of the main monomer employed in the monomer mixture of the present invention is in the range of from about 40 to about 100 weight percent (by total weight of all the polymerizable monomers in the monomer mixture), more preferably the main monomer is present in the range of from about 60 to about 98 weight percent, and most preferably from 75 to 95 weight percent.

The "additional monomer(s)" (i.e., the monomer(s) copolymerizable with the main monomer) employed in the monomer mixture of the present invention can generally be categorized as modifying monomers, functional monomers, and other miscellaneous monomers.

The "modifying monomer(s)" that can be employed in the present invention are typically ethylenically unsaturated acid esters having a $T_g$ (in homopolymerized form) greater than the $T_g$ (in homopolymerized form) of the main monomer. Preferably, the modifying monomer is a (meth)acrylate monomer having a $T_g$ (in homopolymerized form) greater than about 0° C., more preferably greater than 20° C. Examples of suitable modifying monomers include methyl methacrylate, n-butyl methacrylate, methylacrylate, tert-butyl acrylate, ethyl methacrylate, n-propyl methacrylate, isopropyl methacrylate, isobutyl methacrylate, tert-butyl methacrylate, and n-pentyl methacrylate. Particularly preferred modifying monomers include methyl methacrylate and n-butyl methacrylate. When a modifying monomer(s) is employed in the monomer mixture, it is preferred for the modifying monomer(s) to be present in an amount in the range of from about 0 to about 50 weight percent (based on the total weight of all the polymerizable monomers in the monomer mixture), more preferably the modifying monomer is present in an amount in the range of from about 2 to about 30 weight percent, and most preferably in the range of from 5 to 15 weight percent.

The "functional monomer(s)" that can be employed in the present invention are typically polar monomers having at least one functional group which readily free-radically copolymerizes with the main monomer. Suitable functional monomers include ethylenically unsaturated carboxylic acids (and their salts), ethylenically unsaturated sulfonic acids (and their salts), ethylenically unsaturated phosphonic acids (and their salts), ethylenically unsaturated anhydrides, ethylenically unsaturated amines and amides, ethylenically unsaturated alcohols, and ethylenically unsaturated nitriles. Preferred functional monomers include (meth)acrylic acid, itaconic acid, crotonic acid, maleic acid, fumaric acid, vinyl phosphonic acid, 2-acrylamido-2-methylpropylsulfonic acid, maleic anhydride, n,n-dimethylaminoethylacrylate, n,n-dimethylaminoethylmethacrylate, acrylamide, t-butyl acrylamide, n,n-dimethyl amino ethyl acrylamide, n-octyl acrylamide and other n-substituted acrylamides, n,n-dimethylacrylamide and other n,n-disubstituted acrylamides, 2-hydroxyethyl acrylate, 2-hydroxyethyl methacrylate, 3-hydroxypropyl acrylate, 3-hydroxypropyl methacrylates, acrylonitrile, methacrylonitrile, carbowax acrylate, methoxy-ethoxy-ethyl acrylate, mixtures thereof, and the like. Particularly preferred functional monomers include (meth)acrylic acid, itaconic acid, and their amides. Most preferably, the functional monomer is acrylic acid. Generally, it is preferred for the functional monomer(s) to have an acid functionality, more preferably the functional monomer(s) has a carboxylic functionality. When a functional monomer(s) is employed in the monomer mixture, it is preferred for the functional monomer(s) to be present in an amount in the range of from about 0.1 to about 20 weight percent (based on the total weight of all the polymerizable monomers in the monomer mixture), more preferably the functional monomer is present in an amount in the range of from about 0.2 to about 5 weight percent, and most preferably in the range of from 0.5 to 2 weight percent.

The "other miscellaneous monomer(s)" that can be employed in the monomer mixture of the present invention can be selected from any of a variety of monomers known to affect the adhesion properties of the final modified PSA produced by the present invention. Examples of suitable miscellaneous monomers include vinyl ester monomers such as, for example, styrene, vinyl 2-ethylhexanoate, vinyl caprate, vinyl laurate, vinyl pelargonate, vinyl hexanoate, vinyl propionate, vinyl decanoate, and vinyl octanoate. Preferred vinyl ester monomers include styrene, vinyl acetate, vinyl laurate, vinyl caprate, and vinyl-2-ethylhexanoate. When a miscellaneous monomer(s) is employed in the monomer mixture, it is preferred for the miscellaneous monomer(s) to be present in an amount in the range of from about 0 to about 50 weight percent (based on the total weight of all the polymerizable monomers in the monomer mixture), more preferably in the range of from 1 to 20 weight percent.

In a preferred embodiment of the invention, the monomer mixture also comprises a continuous phase (usually water), a surfactant, and, optionally, a tackifier.

The surfactant can be any conventional surfactant or a combination of surfactants known in the art. Generally, the surfactant can be an anionic surfactant or a non-ionic surfactant. Examples of preferred surfactants include, but are not limited to, alkali alkylsulfate, ammonium alkysulfate, alkylsulfonic acid, fatty acid, oxyethylated alkyphenol, sulfosuccinates and derivatives, and mixtures thereof. A list of suitable surfactants is available in the treatise: McCutcheon's Emulsifiers & Detergents, North American Edition, MC Publishing Co., Glen Rock, N.J., 1997, the disclosure of which is incorporated herein by reference. The surfactant can also be a polymerizable surfactant which is a surfactant that contains a polymerizable double bond. Examples of polymerizable surfactants include, but are not limited to, HITENOL™ BC-10, HITENOL™ HS 20, and HITENOL™ HS 10 surfactants (commercially available from Dai-ichi Kogyo Seiyaku Co., Kyoto, Japan) and TREM™ LF40 surfactant (available from Cognis Corporation, Cincinnati, Ohio). The amount of surfactant employed in the monomer mixture is generally in the range of from about 0.1 to about 10 weight percent (based on the total weight of all the polymerizable monomers in the monomer mixture), more preferably 0.2 to 5 weight percent, and most preferably 0.5 to 2 weight percent.

Any tackifier known in the art that can yield the properties desired in the modified PSA produced by the present invention can be used. Generally, the tackifier can be selected from the group consisting of rosins, rosin derivatives, rosin esters, hydrocarbon resins, synthetic polyterpenes, natural terpenes, and the like. More particularly, useful tackifying resins include, but are not limited to, (1) natural and modified rosins and the hydrogenated derivatives thereof; (2) esters of natural and modified rosins and the hydrogenated derivatives thereof; (3) polyterpene resins and hydrogenated polyterpene resins; (4) aliphatic petroleum hydrocarbon resins and the hydrogenated derivatives thereof; (5) aromatic hydrocarbon resins and the hydrogenated derivatives thereof; and (6) alicyclic petroleum hydrocarbon resins and the hydrogenated derivatives thereof. Mixtures of two or more of the above-described tackifiers may be required for some formulations.

Natural and modified rosins and the hydrogenated derivatives thereof include, but are not limited to, gum rosin, wood rosin, tall-oil rosin, distilled rosin, hydrogenated rosin, dimerized rosin, and polymerized rosin. Suitable examples of esters of natural and modified rosins and the hydrogenated derivatives thereof include, but are not limited to, the glycerol ester of rosin, the glycerol ester of hydrogenated rosin, the glycerol ester of polymerized rosin, the pentaerythritol ester of hydrogenated rosin. Polyterpene resins generally result from the polymerization of terpene hydrocarbons, such as the bicyclic monoterpene known as pinene, in the presence of Friedel-Crafts catalysts at moderately low temperatures. Preferably, the polyterpene resins have a softening point, as determined by ASTM method E28-58T, of from about 80° C. to about 150° C. Aliphatic petroleum hydrocarbon resins and hydrogenated derivatives thereof are generally produced from the polymerization of monomers consisting of primarily olefins and diolefins. Preferably, the aliphatic petroleum hydrocarbon resins have a Ball and Ring softening point of from about 70° C. to about 135° C. Aromatic hydrocarbon resins include, for example, hydrocarbon resins derived from at least one alkyl aromatic monomer, such as, for example, styrene, alpha-methyl styrene and vinyl toluene, and the hydrogenated derivatives thereof. The alkyl aromatic monomers can be obtained from petroleum distillate fractions or from non-petroleum feedstocks, such as, for example, feedstocks produced from phenol conversion processes. An alicyclic petroleum hydrocarbon resin can be produced utilizing a hydrocarbon mixture comprising dicyclopentadiene as the monomer. Particularly preferred tackifiers are non-hydrogenated rosin glycerin esters such as, for example, PERMALYN™ 5095 (available from Eastman Chemical Company, Kingsport, Tenn.).

The amount of tackifier employed in the monomer mixture is generally in the range of from about 0.1 to about 10 weight percent (based on the total weight of all the polymerizable monomers in the monomer mixture), more preferably 0.2 to 5 weight percent, and most preferably 0.5 to 2 weight percent.

Polymerization of the monomer mixture can be performed by any polymerization process known in the art such as, for example, emulsion polymerization, solution polymerization, suspension polymerization, micro emulsion polymerization, and inverse emulsion polymerization. However, the method of the present invention is particularly well suited for batch or semi-batch free-radical emulsion polymerization.

In accordance with standard procedures, emulsion polymerization of the monomer mixture can be facilitated by free-radical initiators. Initiators used in polymerization processes may be of a type which produce free-radicals and conveniently are peroxygen compounds, for example: inorganic peroxides such as hydrogen peroxide and inorganic persulfate compounds (e.g., ammonium persulfate, sodium persulfate and potassium persulfate); organic hydroperoxides such as cumene hydroperoxide and tertiary butyl hydroperoxide; and organic peroxides such as benzoyl peroxide, acetyl peroxide, lauroyl peroxide, and peroxydicarbonate esters (e.g., diisopropyl peroxydicarbonate, peracetic acid and perbenzoic acid). Preferably, the initiator is an inorganic persulfate, most preferably ammonium persulfate. The amount of initiator employed during polymerization is preferably in the range of from about 0.1 to about 10 weight percent (based on the total weight of all polymerizable monomers in the monomer mixture), more preferably about 0.2 to about 5 weight percent, and most preferably 0.5 to 1 weight percent. The free-radical initiator may be activated by water-soluble reducing agents such as ferrous compounds, sodium bisulfite or hydroxylamine hydrochloride, and other free-radical producing materials such as 2,2'-azobisisobutyronitrile. The free-radicals required for polymerization can alternatively be produced via a radiation initiator (e.g., x-rays and UV rays), as known in the art.

Generally, the polymerization of the monomer mixture can be accomplished via the continuous addition of the monomer mixture and the initiator to a reaction vessel over a polymerization period of about 0.5 to about 10 hours, more preferably 1 to 5 hours. The temperature in the reaction vessel during polymerization of the monomer mixture is preferably maintained in the range of from about 50° C. to about 120° C., more preferably about 60° C. to about 100° C., and most preferably 75° C. to 90° C. After the desired amount, typically all, of the monomer mixture has been added to the reaction vessel, it is preferred for a post-polymerization period to be employed, during which the remainder of the initiator and monomers can be reacted to minimize the amount of unreacted free monomers left in the polymerized mixture. Typically, the post-polymerization time period ranges from about 0.2 to about 5.0 hours, more preferably 0.5 to 2.0 hours. During the post-polymerization period, the contents of the reaction vessel should be maintained at elevated temperatures, preferably about the same temperatures employed during polymerization.

During polymerization of the monomer mixture, the monomer(s) of the monomer mixture (i.e., the main monomer and, optionally, the modifying, functional, and/or other miscellaneous monomers) are polymerized to form a base polymer. The base polymer preferably includes a polymeric backbone comprising units derived from the main monomer and, optionally, units derived from the modifying, functional, and/or miscellaneous monomer(s), described above. The respective amounts (i.e., weight percents) of units derived from the main, modifying, functional, and/or miscellaneous monomer(s) present in the polymeric backbone of the base polymer is preferably the same quantities/ratios employed in the monomer mixture, described above. The polymeric backbone preferably includes functional groups provided by the functional monomer(s). More preferably, the polymeric backbone has an active hydrogen functionality, most preferably the polymeric backbone includes carboxylic functional groups provided by the functional monomer. The base polymer preferably has a $T_g$ of less than about 0° C., more preferably less than about −10° C., and most preferably in the range of from −60° C. to −30° C.

After polymerization of the monomer mixture is substantially complete, the resulting polymerized mixture is modified with a modifying polymer. As used herein, the term "substantially complete" or "substantial completion" when used to describe the state of polymerization of the monomer mixture, shall denote a state wherein at least about 50 weight percent of the main monomer originally present in the monomer mixture has been polymerized to form the base polymer. Preferably, modification of the polymerized mixture with the modifying polymer does not take place until after at least about 80 weight percent of the main monomer has been polymerized, most preferably after at least 90 weight percent of the main monomer has been polymerized.

Modification of the base polymer with the modifying polymer, in accordance with the present invention, can be performed by simply adding the modifying polymer to the polymerized mixture. The amount of modifying polymer added to the polymerized mixture is preferably in the range of from about 0.01 to about 5.0 weight percent (based on the total weight of all the polymerizable monomers in the monomer mixture), more preferably about 0.02 to about 2.0 weight percent, still more preferably about 0.05 to about 1.0 weight percent, and most preferably 0.075 to 0.5 weight percent.

The modifying polymer added to the polymerized mixture after polymerization is substantially complete is preferably a polymer comprising units derived from a n-vinyl lactam. More preferably, the modifying polymer comprises at least about 50 mole percent of units derived from a n-vinyl lactam. Still more preferably, the modifying polymer is a homopolymer of a n-vinyl lactam. Examples of n-vinyl lactams that can be used to form the modifying polymer include n-vinyl-2-pyrrolidone, n-vinyl-2-piperidone, n-vinyl-2-caprolactam, n-vinyl-3-methyl-2-pyrrolidone, n-vinyl-3-methyl-2-piperidone, n-vinyl-3-methyl-2-caprolactam, n-vinyl-4-methyl-2-pyrrolidone, n-vinyl-4-methyl-2-caprolactam, n-vinyl-5-methyl-2-pyrrolidone, n-vinyl-5-methyl-2-piperidone, n-vinyl-5,5-dimethyl-2-pyrrolidone, n-vinyl-3,3,5-trimethyl-2-pyrrolidone, n-vinyl-5-methyl-5-ethyl-2-pyrrolidone, n-vinyl-3,4,5-trimethyl-3-ethyl-2-pyrrolidone, n-vinyl-6-methyl-2-piperidone, n-vinyl-6-ethyl-2-piperidone, n-vinyl-3,5-dimethyl-2-piperidone, n-vinyl-4,4-dimethyl-2-piperidone, n-vinyl-7-methyl-2-caprolactam, n-vinyl-7-ethyl-2-caprolactam, n-vinyl-3,5-methyl-2-caprolactam, n-vinyl-4,6-dimethyl-2-caprolactam and n-vinyl-3,5,7-trimethyl-2-caprolactam. If desired, mixtures thereof may also be used. It is preferred for the modifying polymer to be a poly(n-vinyl lactam) homopolymer. Particularly preferred poly(n-vinyl lactam) homopolymers include polyvinyl pyrrolidone, polyvinyl piperidone, and polyvinyl caprolactam. Most preferably, the modifying polymer is a highly water soluble polymer such as a polyvinyl pyrrolidone homopolymer. It is preferred for the modifying polymer to have a $T_g$ in the range of from about 50° C. to about 300° C., more preferably about 100° C. to about 250° C., and most preferably 150° C. to 200° C. It is preferred for the modifying polymer to have an average molecular weight in the range of from about 9,000 to about 1,200,000 daltons, more preferably about 15,000 to about 100,000 daltons, and most preferably 30,000 to 60,000 daltons. It is preferred for the modifying polymer to have a K value (indicating intrinsic viscosity) in the range of from about 10 to about 100, more preferably about 15 to about 60, and most preferably 20 to 40.

After and/or while the modifying polymer is added to the polymerized mixture, it is preferred for the polymerized mixture to be maintained at conditions sufficient to allow the modifying polymer to react with the polymerized mixture to thereby form a modified mixture comprising a modified polymer. Preferably, the modifying polymer reacts with, and becomes chemically bound to, the base polymer to produce a modified polymer having an enhanced balance of adhesion properties as compared to those of the base polymer.

When the modifying polymer is reacted with the polymerized mixture, it is preferred for ring-opening of the modified polymer to occur. In order for such ring-opening of the modifying polymer to take place, a sufficient amount of a free-radical initiator should be present in the polymerized mixture along with the modifying polymer. The initiator used to facilitate ring-opening of the modifying polymer can be the same initiator employed to initiate the original polymerization of the monomer mixture, or can be a different initiator capable of generating free-radicals. Thus, the initiator can either be added along with the modifying polymer to the polymerized mixture or, alternatively, the initiator can be left over from the original polymerization of the monomer mixture to form the base polymer. The free-radical initiator used to facilitate ring-opening of the modifying polymer is preferably the same type of initiator used to facilitate polymerization of the monomer mixture. Most preferably, the free-radical initiator used for ring-opening is an inorganic persulfate such as ammonium persulfate.

Once ring-opening of the modifying polymer has occurred, the ring-opened modifying polymer can be grafted and/or crosslinked with the polymeric backbone of the base polymer at the locations of the carboxylic functional groups. Such grafting and/or crosslinking of the modifying polymer with the base polymer produces the modified polymer having enhanced adhesion properties. Preferably, the modified polymer has a $T_g$ of less than about 0° C., more preferably less than about −10° C., and most preferably in the range of from −60° C. to −20° C.

Conditions sufficient to facilitate the ring-opening, grafting, and/or crosslinking reactions described above generally include a temperature in the range of from about 40° C. to about 90° C., more preferably about 50° C. to about 80° C., and most preferably 60° C. to 70° C. The reacting of the modifying polymer with the polymerized mixture can be carried out a pressure in the range of from about 0.5 to about 2 bar, preferably about 0.8 to about 1.5 bar, and most preferably about atmospheric pressure. It is preferred for the reacting of the modifying polymer with the polymerized mixture to be carried out under mixing conditions for a time period in the range of from about 0.01 to about 2 hours, more preferably from 0.05 to 0.5 hours. It is also preferred for the reacting of the modifying polymer with the base polymer to be performed in an acidic environment. Thus, the polymerized mixture to which the modifying polymer is added preferably has a pH of less than about 5.0, more preferably less than about 4.0, and most preferably in the range from 1.0 to 3.0.

The resulting modified mixture containing the modified polymer typically has a pH of less than about 6.0, more typically less than about 5.0, and most typically in the range of from about 1.0 to 4.0. After the modified mixture is formed, it is preferred to neutralize the modified mixture by increasing its pH with a neutralent to at least about 7.0, more preferably in the range of about 8.0 to about 9.0, and most preferably 8.25 to 8.75. Neutralents to be added to the modified mixture can be any neutralent known in the art. Suitable neutralents include, but are not limited to, alkylihydroxides and amines. Examples of alkylihydroxides include sodium hydroxide, potassium hydroxide, and lithium hydroxide. Examples of amines include ethanol amine, triethylamine, and dimethylethanolamine. A particularly preferred neutralent is ammonia.

In a preferred embodiment of the present invention, a further quantity of the modifying polymer can be added to the neutralized mixture to improve the rheological properties of the final PSA. When the modifying polymer is added to the neutralized mixture, it is preferred for the modifying polymer to be added in an amount in the range of from about 0.01 to about 2.0 percent (by weight of the modified polymer present in the neutralized mixture), more preferably 0.05 to 1.0 weight percent.

Various formulating agents may be added to the neutralized mixture (typically a latex) of the present invention. Suitable additives include, but are not limited to, defoamers, wetting agents, thickeners, protective colloids, tackifiers, fillers and/or extenders such as dispersible clays, colorants such as pigments and dyes, solvents, plasticizers, coalescing agents, preservative agents such as biocides, fungicides, and mildewcides, buffers, agents to adjust pH, surfactants, and catalysts.

The PSA compositions according to the invention can be used to make a substrate bearing a coating of a PSA. The method comprises applying an adhesive composition to a surface of a substrate, wherein the adhesive composition is made in accordance with the process described above.

The PSAs of the present invention can be applied to any backing which it is desired to adhere to another surface or article. Illustrative backings include flexible and rigid (solid), natural and synthetic materials such as plastics, elastomers, solid metals and foils, ceramics (tiles, glass, and the like), wood, papers and cardboard, leather materials, etc. of essentially any form including films, solid articles, woven and non-woven textile materials, and the like. Illustrative uses of such articles include wall coverings (paper, fabric, films, and the like), upholstery items, construction roofing and siding materials, tapes of all varieties (including those having backings comprised of woven or non-woven fabrics, paper, polymeric films, metal foils, foams, etc., including double-faced tapes and so-called transfer tapes), packaging, floor and wall tile, other floor and wall coverings, and paneling, and the like.

Suitable backing and substrate materials can be of essentially any chemical composition and include, for example, metals, ceramics (including glass), and natural and synthetic polar and non-polar materials such as polyolefins, e.g., homopolymers and interpolymers of substituted and non-substituted olefinically unsaturated hydrocarbons including ethylene, propylene, styrene, butadiene, dicyclopentadiene, etc., and materials which typically contain polar functional groups such as hydroxy, etheral, carbonyl, carboxylic acid (including carboxylic acid salts), carboxylic acid esters (including thio esters), amides, amines, and the like. Essentially all natural materials include one or more polar functional groups. Illustrative are virgin and reclaimed cellulosic fibers such as cotton, paper, wood, coconut fiber, jute, hemp, and the like, and proteinaceous materials such as leather, wool, and other animal fur. Illustrative synthetic materials containing polar functional groups are polyesters, polyamides, and carboxylated styrene-butadiene polymers. Illustrative of other useful materials which are also polar are synthetic carbon, silicon, and magnesium silicate (e.g., asbestos). Preferred substrates or backings for the adhesive composition of the present invention are polypropylene, polyethylene, polyethylene terephthalate, and polyvinyl chloride.

The modified PSA composition of the present invention may be applied to the backing by any one of a variety of conventional coating techniques such as roll coating, spray coating, and curtain coating. They also may be applied to the backing by extrusion coating, coextrusion, and hot melt coating by employing suitable conventional coating devices known for such coating methods. While primers may be employed to pretreat the backing, they are unnecessary in many applications. Dry coating weight (the weight of dry adhesive applied per unit surface area) can vary substantially depending upon the porosity and irregularity of the backing and of the substrate surface to which the backing is to be adhered, and other factors. For instance, higher polymer loadings are preferred for adhering porous, irregular ceramic tiles to porous surfaces, while lower adhesive loadings are usually required to manufacture tapes, films, and other articles from relatively non-porous, smooth-surfaced materials such as synthetic polymer films and sheets.

The inventive PSAs (hereinafter referred to as "modified PSAs") formed from the modified polymer, described above, generally exhibit a superior balance of adhesion properties versus conventional PSAs (hereinafter referred to as "unmodified PSAs") formed from the unmodified base polymer, also described above. Generally, the modified PSAs exhibit superior shear strength and transfer on steel properties, with similar tack and peel properties relative to unmodified PSAs. The test methods used to determine shear strength, transfer on steel, tack, and peel properties are standard test methods described in detail below in the "Test Methods" section. Preferably, the shear strength of the modified PSA is at least about 25 percent greater than the shear strength of the unmodified PSA, more preferably at least about 50 percent greater, and most preferably at least 75 percent greater. Generally, the shear strength of the modified PSA will be greater than about 1,000 minutes, more preferably greater than about 1,500 minutes, still more preferably greater than about 2,000 minutes, and most preferably greater than 3,000 minutes. Preferably, the transfer on steel of the modified PSA is less than the transfer on steel of the unmodified PSA, more preferably the transfer on steel of the modified PSA is at least about 10 percent less than the transfer on steel of the unmodified PSA, most preferably at least 25 percent less. Generally, the transfer on steel of the modified PSA will be less than about 50 percent, more preferably less than about 30 percent, and most preferably less than about 20 percent. Preferably, the rolling ball tack, loop tack, and peel strength of the modified PSA will be within about 50 percent of the rolling ball tack, loop tack, and peel strength of the unmodified PSA, respectively, more preferably within about 35 percent, and most preferably within 25 percent. Generally, the rolling ball tack of the modified PSA will be in the range of from about 2 to about 4 centimeters, more preferably 2.5 to 3.5 centimeters. Generally, the loop tack of the modified PSA will be in the range of from about 6 to about 12 N/2.5 cm, more preferably from about 7 to about 11 N/2.5 cm, and most preferably 7.5 to 9.5 N/2.5 cm. Generally the peel strength of the modified PSA will be in the range of from about 5 to about 15 N/2.5 cm, most preferably 6 to 12 N/2.5 cm.

The present invention is described in greater detail in the following examples. The following test methods have been employed in the examples.

Test Methods

1. Test samples were prepared by applying to a 25 $\mu$m bi-axially oriented polypropylene (BOPP) backing with corona treatment (38 mN/m), a film of adhesive latex which, when cured, forms a 20 g/m$^2$ dry deposit. Emulsion polymers were applied in layer of 80 $\mu$m and dried at 105° C. (221° F.) for 3 minutes covered with release liner and aged 24 hours at 23±2° C. (73.4±3.4° F.) and 50±5% relative humidity.

2. Shear strength was determined in accordance with PSTC-7 ("Pressure Sensitive Tape Council") and is a measure of the cohesive strength of an adhesive. This method is used to determine the shear resistance of a pressure sensitive adhesive under a constant load. It is based on the time required for a static loaded tape sample to separate from a standard flat surface in a direction essentially parallel to the surface to which it has been fixed with a standard pressure. A coated strip (2.5×2.5 cm) is applied to a stainless steel plate and a 1,000 gram weight is attached to the bottom of the film. The steel panel with the coated strip attached is held in a rack such that the panel forms an angle of 178° to 180°. The time, in minutes, required to total failure of the test strip at 23° C. is recorded as the shear strength.

3. Peel strength was determined in accordance with PSTC-1 and is a measure of the force required to remove a pressure sensitive tape from a stainless steel panel at a specified angle (180°) and speed (300 mm/min.). A 2.5 cm width of coated sheet is applied to a horizontal surface of a clean, stainless steel test plate with at least 16 cm of coated sheet material in firm contact with the steel plate. A hard rubber roller is used to firmly apply the strip and remove all discontinuities and entrapped air. The free end of the coated strip is then doubled back nearly touching itself so that the angle of removal from the steel plate will be 180° C. The steel panel and the free end of the coated strip is then attached to the jaw of tensile tester. The jaw with free end of coated strip moves away at the rate of 300 mm per minute. The force, in N/2.5 cm, required to remove the coated strip is recorded as the peel strength.

4. Rolling Ball Tack was determined in accordance with PSTC-6. The rolling ball tack test is designed to measure the softness to a pressure sensitive adhesive. In the determination of tack by rolling ball method, a steel ball is released at the top of an incline, allowed to accelerate down the incline and roll onto a horizontal surface covered with a pressure sensitive adhesive (30×5 cm). The distance that the stainless steel ball travels on the adhesive film is measured and recorded as the rolling ball tack.

5. Loop Tack was determined in accordance with FINAT-9 (FINAT Technical Handbook, 5$^{th}$ Edition, 1999, pp. 22–24, incorporated herein by reference). It determines the force required to break the bond that is formed when a pressure sensitive adhesive is brought into contact with a test surface from stainless steel. A loop of coated strip (17.5×2.5 cm) with adhesive outermost is attached to the flexible jaw of tensile tester and then it is brought into the contact with stainless steel plate (2.5 cm width). When full contact over the plate is achieved (2.5×2.5 cm) immediately reverse the direction of the machine and allow separation to take place at a speed of 300 mm per minute. Maximum force necessary to completely separation of the loop from the stainless steel plate is recorded as the loop tack.

6. Transfer onto steel was monitored during the peel strength test and was interpreted as an amount of adhesive, which was transferred from substrate onto steel in percentage.

EXAMPLE 1

Preparation of Sample 1 (Comparative)

An acrylic emulsion polymer was prepared from a monomer mixture containing 470 grams of water, 29 grams of a 30% solution of fatty alcohol ether (12 EO units) sulfate Na salt (DISPONIL™ FES 993 IS, available from Cognis Corporation, Cincinnati, Ohio), 947 grams of n-butyl acrylate, 75 grams of butyl methacrylate, 12.4 grams of acrylic acid, and 3.5 grams of modified polyalkylene glycol (cosurfactant) (DEHYDRAN™ 240, available from Cognis). The kettle containing 276 grams of water was heated to 80° C.

An initiator charge of 0.85 grams of ammonium persulfate dissolved in 10 grams of water and 2.0 grams of sodium metabisulphite dissolved in 18.7 grams of water were added. The monomer emulsion was then gradually added over a three hour period along with 7.5 grams of ammonium persulfate dissolved in 85.5 grams of water in a separate feed. After the three hour period emulsion was heated for additional hour at 85° C. After that the latex was cooled to 40° C. at which point latex was neutralized with aqueous ammonia to achieve a pH value of 8.5. Consecutively wetting agent (DEHYDRAN™ 240) and defoamer (FOAMASTER™ 306, available from Cognis) were added. The wetting agent was added in a 0.5 to 2.0 percent quantity, based on the weight of the final product. The defoamer was added in a 0.1 to 0.5 percent quantity, based on the weight of the final product. The latex was then cooled to ambient temperature.

EXAMPLE 2
Preparation of Sample 2

An acrylic emulsion polymer was prepared in a similar manner to Sample 1 using a monomer mixture containing 470 grams of water, 29 grams of a 30% solution of fatty alcohol ether (12 EO units) sulfate Na salt (DISPONIL™ FES 993 IS), 947 grams of n-butyl acrylate, 75 grams of butyl methacrylate, 12.4 grams of acrylic acid, and 3.5 grams of modified polyalkylene glycol (cosurfactant) (DEHYDRAN™ 240). The kettle containing 276 grams of water was heated to 80° C. An initiator charge of 0.85 grams of ammonium persulfate dissolved in 10 grams of water and 2.0 grams of sodium metabisulphite dissolved in 18.7 grams of water were added. The monomer emulsion was then gradually added over a three hour period along with 7.5 grams of ammonium persulfate dissolved in 85.5 grams of water in a separate feed. After the three hour period emulsion was heated for additional hour at 85° C. After that the emulsion was cooled to 65° C. at which point latex was treated with 3.1 grams of polyvinylpyrrolidone (LUVISKOL™ K30, available from BASF Corporation, Mount Olive, N.J.) dissolved in 9.3 grams of water. The emulsion was mixed for 10 minutes and cooled to 40° C. and neutralized with aqueous ammonia to achieve a pH value of 8.5. Consecutively wetting agent (DEHYDRAN™ 240) and defoamer (FOAMASTER™ 306) were added. The wetting agent was added in a 0.5 to 2.0 percent quantity, based on the weight of the final product. The defoamer was added in a 0.1 to 0.5 percent quantity, based on the weight of the final product. The latex was then cooled to ambient temperature.

EXAMPLE 3
Preparation of Sample 3

Sample 3 was prepared in a similar manner to Sample 2 using a monomer mixture containing 470 grams of water, 29 grams of a 30% solution of fatty alcohol ether (12 EO units) sulfate Na salt (DISPONIL™ FES 993 IS), 947 grams of n-butyl acrylate, 75 grams of butyl methacrylate, 12.4 grams of acrylic acid, and 3.5 grams of modified polyalkylene glycol (cosurfactant) (DEHYDRAN™ 240). The kettle containing 276 grams of water was heated to 80° C. An initiator charge of 0.85 grams of ammonium persulfate dissolved in 10 grams of water and 2.0 grams of sodium metabisulphite dissolved in 18.7 grams of water were added. The monomer emulsion was then gradually added over a three hour period along with 7.5 grams of ammonium persulfate dissolved in 85.5 grams of water in a separate feed. After the three hour period emulsion was heated for additional hour at 85° C. After that the emulsion was cooled to 65° C. at which point latex was treated with 3.1 grams of polyvinylpyrrolidone (LUVISKOL™ K30) dissolved in 9.3 grams of water. The emulsion was mixed for 10 minutes and cooled to 40° C. and neutralized with aqueous ammonia to achieve a pH value of 8.5. After neutralization 5.2 grams of polyvinylpyrrolidone dissolved in 9.3 grams of water was added to the latex and consecutively wetting agent (DEHYDRAN™ 240) and defoamer (FOAMASTER™ 306) were added. The wetting agent was added in a 0.5 to 2.0 percent quantity, based on the weight of the final product. The defoamer was added in a 0.1 to 0.5 percent quantity, based on the weight of the final product. The latex was then cooled to ambient temperature.

TABLE 1

|  | R.B.T. (cm) | Peel Strength (N/2.5 cm) | Loop Tack (N/2.5 cm) | Shear (min.) | Transfer onto Steel (%) |
|---|---|---|---|---|---|
| Sample 1 (comp.) | 2.8 | 11.5 | 9.5 | 620 | 50 |
| Sample 2 | 2.9 | 10.7 | 8.4 | >1440 | 26 |
| Sample 3 | 3.3 | 8.4 | 8.4 | >1440 | 0 |

EXAMPLE 4
Preparation of Sample 4 (Comparative)

An acrylic emulsion polymer was prepared from a monomer mixture containing 412 grams of water, 35.2 grams of a 30% solution of fatty alcohol ether (30 EO units) sulfate Na salt (DISPONIL™ FES 77 IS, available from Cognis), 10.4 grams of a 30% solution of fatty alcohol ether (12 EO units) sulfate Na salt (DISPONIL™ FES 993 IS), 959 grams of n-butyl acrylate, 73 grams of methyl methacrylate and 10.4 grams of acrylic acid. The kettle containing 202 grams of water was heated to 80° C. An initiator charge of 1.2 grams of ammonium persulfate dissolved in 15.4 grams of water and 0.5 grams of sodium metabisulphite dissolved in 20.3 grams of water were added. The monomer emulsion was then gradually added over a three hour period along with 7.1 grams of ammonium persulfate dissolved in 88.3 grams of water and with 1.6 grams of sodium metabisulphite dissolved in 61 grams of water in a separate feeds. After the three hour period emulsion was heated for additional hour at 85° C. After that the latex was cooled to 40° C. at which point latex was neutralized with aqueous ammonia to achieve a pH value of 8.5. Consecutively wetting agent (DEHYDRAN™ 240) and defoamer (FOAMASTER™ 306) and thickener (RHEOLATE™ 350, available from Elementis Specialties, Hightstown, N.J.) were added. The wetting agent was added in a 0.5 to 2.0 percent quantity, based on the weight of the final product. The defoamer was added in a 0.1 to 0.5 percent quantity, based on the weight of the final product. The thickener was added in a 0.1 to 1.5 percent quantity, based on the weight of the final product. The latex was then cooled to ambient temperature.

EXAMPLE 5
Preparation of Sample 5

Sample 5 was prepared in a similar manner to Sample 4 using a monomer mixture containing 412 grams of water, 35.2 grams of a 30% solution of fatty alcohol ether (30 EO units) sulfate Na salt (DISPONIL™ FES 77 IS), 10.4 grams of a 30% solution of fatty alcohol ether (12 EO units) sulfate Na salt (DISPONIL™ FES 993 IS), 959 grams of n-butyl acrylate, 73 grams of methyl methacrylate and 10.4 grams of acrylic acid. The kettle containing 202 grams of water was heated to 80° C. An initiator charge of 1.2 grams of ammonium persulfate dissolved in 15.4 grams of water and 0.5 grams of sodium metabisulphite dissolved in 20.3 grams of water were added. The monomer emulsion was then gradually added over a three hour period along with 7.1 grams of ammonium persulfate dissolved in 88.3 grams of water and with 1.6 grams of sodium metabisulphite dissolved in 61 grams of water in a separate feed. After the three hour period emulsion was heated for additional hour at 85° C. After that the emulsion was cooled to 65° C. at which point latex was treated with 1.0 gram of polyvinylpyrrolidone (LUVISKOL™ K30) dissolved in 9.3 grams of water. The emulsion was mixed for 10 minutes and cooled to 40° C. and neutralized with aqueous ammonia to achieve a pH value of 8.5. After neutralization 1.6 grams of polyvinylpyrrolidone (as above) dissolved in 14.1 grams of water was added to the latex and consecutively wetting agent (DEHYDRAN™ 240), defoamer (FOAMASTER™ 306) and thickener (RHEOLATE™ 350) were added. The wetting agent was added in a 0.5 to 2.0 percent quantity, based on the weight of the final product. The defoamer was added in a 0.1 to 0.5 percent quantity, based on the weight of the final product. The thickener was added in a 0.1 to 1.5 percent quantity, based on the weight of the final product. The latex was then cooled to ambient temperature.

EXAMPLE 6
Preparation of Sample 6 (Internally Tackified Latex)

Sample 6 was prepared in a similar manner to Sample 4 using a monomer mixture containing 412 grams of water, 35.2 grams of a 30% solution of fatty alcohol ether (30 EO units) sulfate Na salt (DISPONIL™ FES 77 IS), 10.4 grams of a 30% solution of fatty alcohol ether (12 EO units) sulfate Na salt (DISPONIL™ FES 993 IS), 823 grams of n-butyl acrylate, 73 grams of methyl methacrylate and 10.4 grams of acrylic acid. To this monomer mixture 10.4 grams of tackifier (PERMALYN™ 5095, available from Eastman Chemical Company, Kingsport, Tenn.) dissolved in 120 grams of n-butyl acrylate was slowly added under agitation. The kettle containing 202 grams of water was heated to 80° C. An initiator charge of 1.2 grams of ammonium persulfate dissolved in 15.4 grams of water and 0.5 grams of sodium metabisulphite dissolved in 20.3 grams of water were added. The monomer emulsion was then gradually added over a three hour period along with 7.1 grams of ammonium persulfate dissolved in 88.3 grams of water and with 1.6 grams of sodium metabisulphite dissolved in 61 grams of water in a separate feeds. After the three hour period emulsion was heated for additional hour at 85° C. After that the latex was cooled to 40° C. at which point latex was neutralized with aqueous ammonia to achieve a pH value of 8.5. Consecutively wetting agent (DEHYDRAN™ 240) and defoamer (FOAMASTER™ 306) and thickener (RHEOLATE™ 350) were added. The wetting agent was added in a 0.5 to 2.0 percent quantity, based on the weight of the final product. The defoamer was added in a 0.1 to 0.5 percent quantity, based on the weight of the final product. The thickener was added in a 0.1 to 1.5 percent quantity, based on the weight of the final product. The latex was then cooled to ambient temperature.

EXAMPLE 7
Preparation of Sample 7 (Internally Tackified Latex)

Sample 7 was prepared in a similar manner to Sample 6 using a monomer mixture containing 412 grains of water, 35.2 grams of a 30% solution of fatty alcohol ether (30 EO units) sulfate Na salt (DISPONIL™ FES 77 IS), 10.4 grams of a 30% solution of fatty alcohol ether (12 EO units) sulfate Na salt (DISPONIL™ FES 993 IS), 823 grams of n-butyl acrylate, 73 grams of methyl methacrylate and 10.4 grams of acrylic acid. To this monomer mixture 10.4 grams of tackifier (PERMALYN™ 5095) dissolved in 120 grams of n-butyl acrylate was slowly added under agitation. The kettle containing 202 grams of water was heated to 80° C. An initiator charge of 1.2 grams of ammonium persulfate dissolved in 15.4 grams of wafer and 0.5 grams of sodium metabisulphite dissolved in 20.3 grams of water were added. The monomer emulsion was then gradually added over a three hour period along with 7.1 grams of ammonium persulfate dissolved in 88.3 grams of water and with 1.6 grams of sodium metabisulphite dissolved in 61 grams of water in a separate feeds. After that the emulsion was cooled to 65° C. at which point latex was treated with 1.0 gram of polyvinylpyrrolidone (LUVISKOL™ K30) dissolved in 9.3 grams of water The emulsion was mixed for 10 minutes and cooled to 40° C. and neutralized with aqueous ammonia to achieve a pH value of 8.5. After neutralization 1.6 grams of polyvinylpyrrolidone (LUVISKOL™ K30) dissolved in 14.1 grams of water was added to the latex and consecutively wetting agent (DEHYDRAN™ 240), defoamer (FOAMASTER™ 306) and thickener (RHEOLATE™ 350) were added. The wetting agent was added in a 0.5 to 2.0 percent quantity, based on the weight of the final product. The defoamer was added in a 0.1 to 0.5 percent quantity, based on the weight of the final product, the thickener was added in a 0.1 to 1.5 percent quantity, based on the weight of the final product. The latex was then cooled to ambient temperature.

TABLE 2

| | R.B.T. (cm) | Peel Strength (N/2.5 cm) | Loop Tack (N/2.5 cm) | Shear (min.) |
|---|---|---|---|---|
| Sample 4 (comp.) | 3.0 | 7.4 | 8.0 | 996 |
| Sample 5 | 3.3 | 6.8 | 8.1 | >1440 |
| Sample 6 | 2.1 | 9.6 | 8.0 | 716 |
| Sample 7 | 2.9 | 11.2 | 9.0 | >1440 (3500) |

EXAMPLE 8

Samples 8–19 were prepared in a similar manner to Sample 7, but different tackifiers were used instead of PERMALYN™ 5095.

TABLE 3

| | Tackifier | Description of Tackifier |
|---|---|---|
| Sample 7 | PERMALYN™ 5095 | rosin, glycerin ester, non-hydrogenated |
| Sample 8 | HERCULES™ AR 100 | modified aromatic resin |
| Sample 9 | EASTOTACK™ H 100 R | aliphatic hydrocarbon resin |
| Sample 10 | HERCOTACK™ 205 | modified aliphatic hydrocarbon resin |
| Sample 11 | HERCULES™ A 101 | aromatic hydrocarbon resin |
| Sample 12 | STAYBELITE™ E 10 | rosin, glycerin ester, partially hydrogenated |
| Sample 13 | PICCOTACK™ 95 E | aliphatic hydrocarbon resin |
| Sample 14 | REGALITE™ R 91 | hydrocarbon resin, totally hydrogenated |
| Sample 15 | HERCULES™ MBG 246 | hydrocarbon resin, partially hydrogenated |
| Sample 16 | REGALITE™ R 101 | hydrocarbon resin, totally hydrogenated |
| Sample 17 | HERCULES™ MBG 275 | hydrocarbon resin, partially hydrogenated |
| Sample 18 | PERMALYN™ 5110 | rosin, pentaerythrite ester, non-hydrogenated |
| Sample 19 | PERMALYN™ 6110 | rosin, pentaerythrite ester, non-hydrogenated |

TABLE 4

| | Tackifier (1%/monomers) | Peel Strength (N/2.5 cm) | Loop Tack (N/2.5 cm) | Shear (min.) |
|---|---|---|---|---|
| Sample 7 | PERMALYN™ 5095 | 11.2 | 9.0 | >1440 (3500) |

TABLE 4-continued

|  | Tackifier (1%/monomers) | Peel Strength (N/2.5 cm) | Loop Tack (N/2.5 cm) (min.) | Shear |
|---|---|---|---|---|
| Sample 8 | HERCULES ™ AR 100 | 6.1 | 5.6 | >1440 |
| Sample 9 | EASTOTACK ™ H 100 R | 7.7 | 5.2 | >1440 |
| Sample 10 | HERCOTACK ™ 205 | 7.3 | 6.7 | >1440 |
| Sample 11 | HERCULES ™ A 101 | 7.4 | 5.8 | >1440 |
| Sample 12 | STAYBELITE ™ E 10 | 8.0 | 6.1 | >1440 |
| Sample 13 | PICCOTACK ™ 95 E | 6.6 | 4.5 | >1440 |
| Sample 14 | REGALITE ™ R 91 | 8.0 | 6.3 | >1440 |
| Sample 15 | HERCULES ™ MBG 246 | 8.2 | 4.8 | >1440 |
| Sample 16 | REGALITE ™ R 101 | 7.4 | 6.5 | >1440 |
| Sample 17 | HERCULES ™ MBG 275 | 8.1 | 2.5 | >1440 |
| Sample 18 | PERMALYN ™ 5110 | 8.3 | 6.6 | >1440 |
| Sample 19 | PERMALYN ™ 6110 | 8.5 | 4.7 | >1440 |

That which is claimed is:

1. A method of making a pressure sensitive adhesive comprising:
    forming a monomer mixture comprising a main monomer; polymerizing said monomer mixture to thereby form a polymerized mixture comprising a base polymer having units derived from said main monomer; and after substantial completion of said polymerizing step, reacting a modifying polymer comprising units derived from a n-vinyl lactam with said polymerized mixture in the presence of a free-radical initiator to thereby form a modified mixture comprising a modified polymer.

2. The method of claim 1 wherein said modifying polymer comprises at least about 50 mole percent of units derived from said n-vinyl lactam.

3. The method of claim 1 wherein said modifying polymer is a poly(n-vinyl lactam) homopolymer.

4. The method of claim 1 wherein said modifying polymer is selected from the group consisting of polyvinyl pyrrolidone, polyvinyl piperidone, and polyvinyl caprolactam.

5. The method of claim 1 wherein said modifying polymer is a polyvinyl pyrrolidone homopolymer.

6. The method of claim 1 wherein said reacting step includes adding about 0.01 to about 5.0 weight percent, based on the total weight of monomers in said monomer mixture, of said modifying polymer to said polymerized mixture.

7. The method of claim 1 wherein said reacting step includes adding about 0.05 to about 1.0 weight percent, based on the total weight of monomers in said monomer mixture, of said modifying polymer to said polymerized mixture.

8. The method of claim 1 wherein said reacting step is performed after at least about 80 weight percent of said main monomer originally present in said monomer mixture has been polymerized.

9. The method of claim 1 wherein said reacting step includes reacting said modifying polymer with said base polymer to produce said modified polymer.

10. The method of claim 9 wherein said reacting step includes chemically binding said modifying polymer and said base polymer.

11. The method of claim 10 wherein said reacting step includes ring-opening of at least a portion of said modifying monomer.

12. The method of claim 11 wherein said ring-opening is facilitated by said free-radical initiator.

13. The method of claim 12 wherein said free-radical initiator is an inorganic persulfate.

14. The method of claim 1 wherein said polymerizing step is carried out via emulsion polymerization.

15. The method of claim 1 wherein said polymerized mixture has a pH of less than about 5.0.

16. The method of claim 1 further comprising the step of neutralizing said modified mixture to thereby provide a neutralized mixture having a pH of at least about 7.0.

17. The method of claim 16 wherein said neutralized mixture has a pH of about 8.0 to about 9.0.

18. The method of claim 17 wherein said modified mixture has a pH of less than about 6.0.

19. The method of claim 16 further comprising the step of adding said modifying polymer to said neutralized mixture.

20. The method of claim 1 wherein said main monomer is an ethylenically unsaturated acid ester having a glass transition temperature of less than about 0° C. in homopolymerized form.

21. The method of claim 20 wherein said main monomer is selected from the group consisting of n-butyl acrylate, 2-ethylhexyl acrylate, and iso-octyl acrylate.

22. The method of claim 20 wherein said monomer mixture further comprises an ethylenically unsaturated acid.

23. The method of claim 22 wherein said main monomer is n-butyl acrylate and said ethylenically unsaturated acid is acrylic acid.

24. The method of claim 23 wherein said monomer mixture further comprises an ethylenically unsaturated acid ester having a glass transition temperature of at least about 0° C. in homopolymerized form.

25. A pressure sensitive adhesive composition produced by the method of claim 1.

* * * * *